June 4, 1963  H. CASH, JR  3,092,376
SPRING CUSHION CONSTRUCTION
Filed July 6, 1961
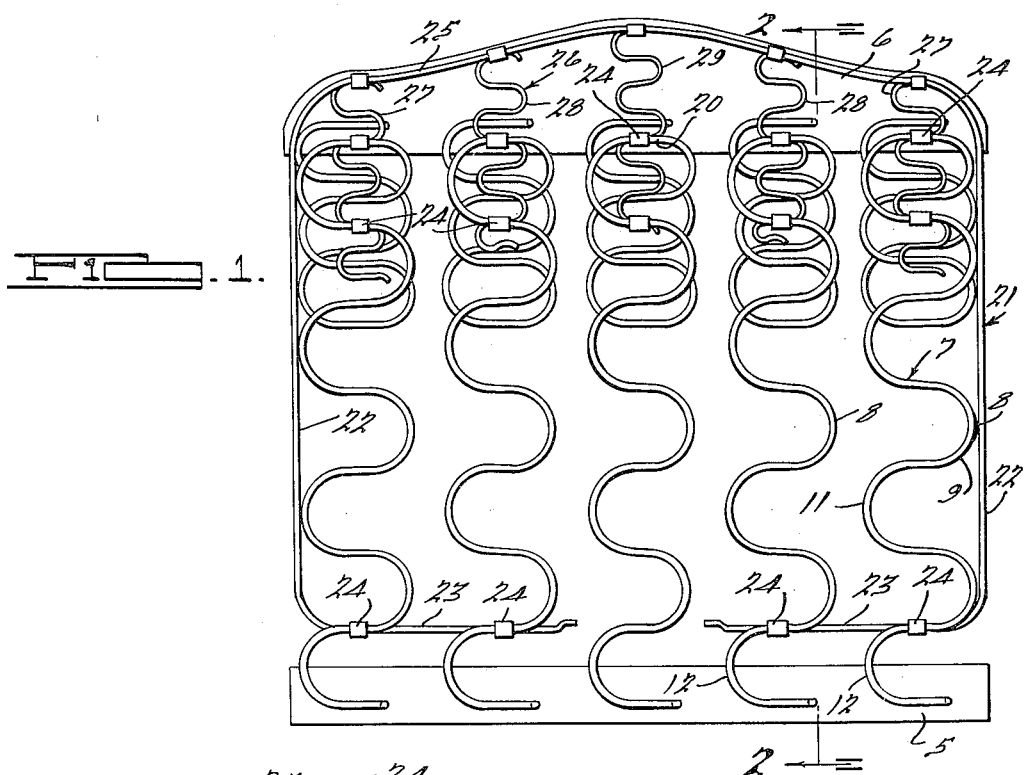
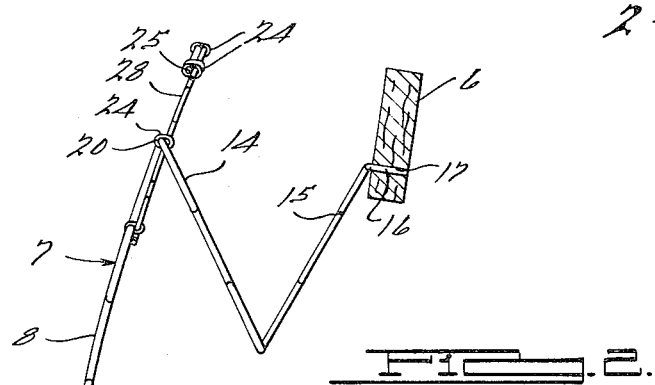
INVENTOR.
Harvey Cash, Jr.
BY
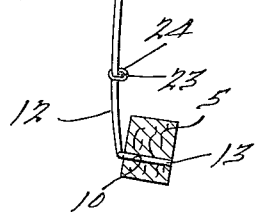
ATTORNEYS.

United States Patent Office 3,092,376
Patented June 4, 1963

3,092,376
SPRING CUSHION CONSTRUCTION
Harvey Cash, Jr., Los Angeles, Calif., assignor to No-Sag Spring Company, Detroit, Mich., a corporation of Michigan
Filed July 6, 1961, Ser. No. 122,227
6 Claims. (Cl. 267—102)

This invention relates to spring cushion constructions, and particularly to a cushion construction having at least one curved border edge.

Difficulty has been experienced in the past when employing sinuous spring strips to form a seat or back cushion having a curved or sculptured edge along one side thereof. The present invention overcomes this difficulty by employing like spring strips for constructing the main load bearing section of the cushion and applying to an edge thereof like lengths of filler spring strips of less width and smaller loops than those of the load bearing spring strips. The smaller spring strips are secured to the main load bearing spring strips at different points in their length so that the ends will extend different amounts beyond the main spring strips in position to engage curved sections of a border wire disposed therealong.

A back cushion is herein illustrated and described by way of example to show a curved top edge on a cushion construction made from like load bearing and like filler spring strips. The load bearing spring strips are of sinuous form and have large loops. At the top, a portion is reversely bent and formed into V shape to provide a supporting section. The end sections of the wire of the load bearing spring strips are bent at right angles in position to be inserted into apertures in a frame so as to be securely anchored in position thereby.

The filler spring strips are also of sinuous form having smaller loops and being of less width which permits different loops to be secured at different points to the larger end loops of the load bearing spring strips. By so securing the smaller spring strips to the large end loops, the ends of the smaller strips will extend therefrom different amounts so as to have the ends engage a predetermined shaped border wire which forms a curved or sculptured top edge for the cushion. The border wire extends along the sides of the cushion adjacent to the edge spring strips of the assembly. The ends of the border wire are bent inwardly near the bottom of the assembly and are secured to the bottom loops of the load bearing spring strips. The wire employed for the large and small spring strips and for the border edge may be of the same or of different gauge, depending upon the type of cushion to be constructed.

Accordingly, the main objects of the invention are: to form a spring cushion from load bearing spring strips having secured to one end thereof lengths of sinuous spring strips of less width and of smaller loops in a manner to have the extending ends engage curved sections of a border wire at one edge of the cushion; to form a seat cushion from load bearing sinuous spring strips which support straight portions of a border wire at the sides, with a curved section therebetween spaced from the spring strips and engaged by the ends of filler spring strips which are attached to the ends of the load bearing spring strips; to provide a load bearing spring strip of sinuous form having one end reversely bent to form a supporting end, with the end loop forming a support for a sinuous spring strip which is secured thereto and extended therebeyond, and, in general, to provide a spring unit for a cushion which supports the load and spans the area between the load supporting spring strip and a curved section of a border wire extending outwardly therefrom.

Other objects and features of novelty of the invention will be specifically pointed out or will become apparent when referring, for a better understanding of the invention, to the following description taken in conjunction with the accompanying drawing, wherein:

FIGURE 1 is a view of a back cushion embodying features of the present invention, and FIG. 2 is a side view of the structure illustrated in FIG. 1.

The back cushion of the present invention comprises spaced rails 5 and 6 between which sinuous spring strips 7 are secured. The spring strips 7 have a load bearing area 8 containing a plurality of oppositely disposed adjacent loops 9 and 11. The bottom loop 12 has its wire end 13 reversely bent to extend rearwardly in a horizontal plane and secured in an aperture 10 in the rail 5, as clearly illustrated in FIG. 2. The top end of the load bearing section 8 has a rearwardly and downwardly sloping section 14 and an upwardly and rearwardly sloping section 15 forming a V-supporting portion. The wire end 16 of the section 15 is reversely bent to extend rearwardly in a horizontal plane and secured in an aperture 17 in the top frame 6. Similar spring assemblies were employed heretofore when a rectangular border wire was employed and joined the straight top edge of the spring strips.

In the present arrangement, a border wire 21 is employed having side sections 22 which are turned inwardly at 23 at the bottom and secured by bands 24 to the top portion of the bottom loops 12 of the spring strips 7. The side portions 22 of the border wire are joined by the top edge portion 25 which is of curved section. The portion 25 is spaced from the top ends 20 of the load bearing area of the spring strips 7. Filler spring strips 26 are employed for spanning the space between the ends 20 and the border section 25 of the border wire. The filler spring strips 26 are of like construction and of the same length. As herein illustrated, the filler spring strips are of lighter gauge wire with smaller loop sections and of narrower widths than the spring strips 7. Bands 24 are employed to secure portions of the filler strip 26 to the top loops of the spring strip 7. With such construction it will be noted that the sidemost spring strips 26, herein designated as spring strips 27, have a right and left-hand loop extending beyond the end 20 of the spring strip 7. The filler strips 26 designated as spring strips 28, disposed inwardly from the end spring strips 27, have two right-hand loops and a single left-hand loop extending beyond the supporting loops 20. The central filler strip 26, designated as spring strip 29, has two right-hand and two left-hand loops extending beyond the end loop 20 of the center load bearing spring strip.

Various shapes of border edge may be provided by the use of the filler strips 26 secured to the load bearing spring strips in a manner to have different lengths extending therebeyond. It would be extremely difficult to form the main load bearing strips 7 of the different lengths to support the curved border wire at the top, and the entire structure is simplified by using like load bearing spring strips 7 and provided like lengths of the sinuous strips 26 to be applied thereto. While the use of the different spring strips for producing a contoured end on a cushion is herein described as being applied to a back cushion, it is to be understood that the same arrangement could be employed at the front end of a seat cushion to provide a soft edge construction, as would be apparent for examining the right-hand end of the construction illustrated in FIG. 2. It is to be understood that the left-hand end of the spring strips 7 would be of some other form to provide softness to the resulting seat cushion along the rear edge thereof.

What is claimed is:

1. In a spring cushion construction forming the back of a seat, a frame, a plurality of load bearing spring strips having edge loops joined by transverse straight portions spanning said frame, an arcuate border wire spaced from the top edge of said spring strips, filler sinuous spring strips applied to the ends of the load bearing spring strips for extending the lengths thereof different amounts to engage the arcuate border wire, and means securing the sinuous spring strips to the end loop of the load bearing spring strips.

2. In a spring cushion construction forming the back of a seat, a frame, a plurality of load bearing spring strips having edge loops joined by transverse straight portions spanning said frame, an arcuate border wire spaced from the top edge of said spring strips, filler sinuous spring strips applied to the ends of the load bearing spring strips for extending the length thereof different amounts to engage the arcuate border wire, and means securing the sinuous spring strips to the end loop of the load bearing spring strips, said load bearing spring strips being of the same length and like construction.

3. In a spring cushion construction forming the back of a seat, a frame, a plurality of load bearing spring strips having edge loops joined by transverse straight portions spanning said frame, an arcuate border wire spaced from the top edge of said spring strips, filler sinuous spring strips applied to the ends of the load bearing spring strips for extending the lengths thereof different amounts to engage the arcuate border wire, and means securing the sinuous spring strips to the end loop of the load bearing spring strips, said load bearing spring strips being of the same length and like construction, said filler spring strips being of the same length and extending different amounts from said load bearing spring strips.

4. In a spring cushion construction, a frame, a plurality of like load bearing sinuous spring strips having a curved reversely bent supporting portion at one end, a curved border wire extending beyond said load bearing spring strips at said one end substantially in the plane thereof, and filler sinuous spring strips of like lengths secured to the load bearing portion of the spring strip at said one end in such manner as to have different lengths extending therefrom to engage said border wire and fill the space between the border wire and the load bearing portion of the first said spring strips.

5. In a spring cushion construction, a frame, a plurality of like load bearing sinuous spring strips having a curved reversely bent supporting portion at one end, a curved border wire extending beyond said load bearing spring strips at said one end substantially in the plane thereof, and filler sinuous spring strips of like lengths secured to the load bearing portion of the spring strip at said one end in such manner as to have different lengths extending therefrom to engage said border wire and fill the space between the border wire and the load bearing portion of the first said spring strips, said sinuous spring strips having oppositely disposed loops joined by straight portions, the loops and straight portions of the filler spring strips being smaller than those of the load bearing spring strips.

6. A spring unit embodying a load bearing spring strip having a reversely bent supporting section at one end, and a filler spring strip secured to and extended from the load bearing spring strip at said one end in the plane thereof, said filler spring strip having oppositely disposed loops joined by straight portions, the loops and straight portions of the filler spring strip being smaller than those of the load bearing spring strip.

References Cited in the file of this patent

UNITED STATES PATENTS 2,341,015   Blumensaadt et al. _____ Feb. 8, 1944

FOREIGN PATENTS 530,569   Canada _____ Sept. 18, 1956